Aug. 30, 1932.  F. G. G. ARMSTRONG  1,875,314
SUSPENSION ARRANGEMENT FOR ROAD AND THE LIKE VEHICLES
Filed Nov. 18, 1931  3 Sheets-Sheet 1

INVENTOR
Fullerton G. G. Armstrong,
BY
ATTORNEY

Aug. 30, 1932.　　F. G. G. ARMSTRONG　　1,875,314
SUSPENSION ARRANGEMENT FOR ROAD AND THE LIKE VEHICLES
Filed Nov. 18, 1931　　3 Sheets-Sheet 2
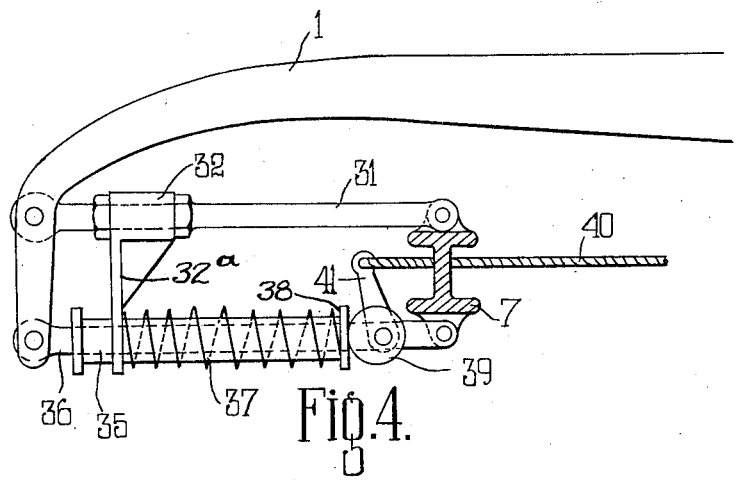
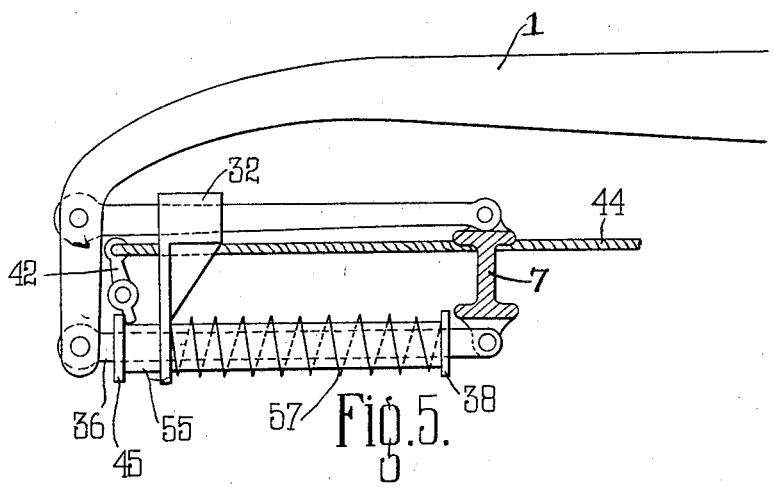
INVENTOR
Fullerton G. G. Armstrong,
BY
ATTORNEYS.

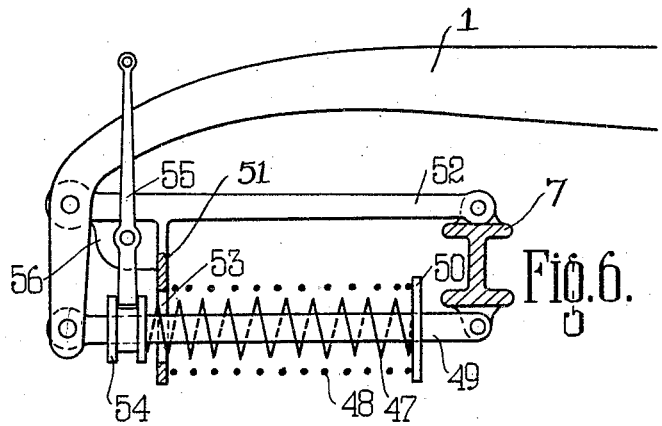
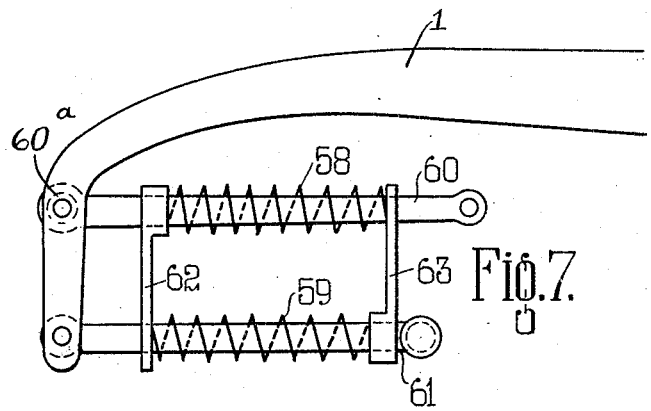

Patented Aug. 30, 1932

1,875,314

UNITED STATES PATENT OFFICE

FULLERTON GEORGE GORDON ARMSTRONG, OF BEVERLEY, ENGLAND

SUSPENSION ARRANGEMENT FOR ROAD AND THE LIKE VEHICLES

Application filed November 18, 1931. Serial No. 575,931.

The present invention relates to an improved suspension arrangement for road or rail vehicles.

According to the present invention, the frame is provided with a vertical or substantially vertical rigid extension piece having a pair of pivots for the connection of a pair of intermediate elements, the opposite ends of one or both of which may be attached to or rigid with an axle of the vehicle, said two intermediate elements being provided with one or more staggered projections between which an energy absorbing element such as a spring or rubber block is mounted to form a suspension device.

The invention is more particularly described with reference to the accompanying drawings in which:—

Figures 4 and 5 are diagrammatic views of constructions similar to Figure 3 having means whereby the load on the resilient element may be varied from a remote place and Figures 6 and 7 show further modified constructions.

Figures 1, 2, 3:
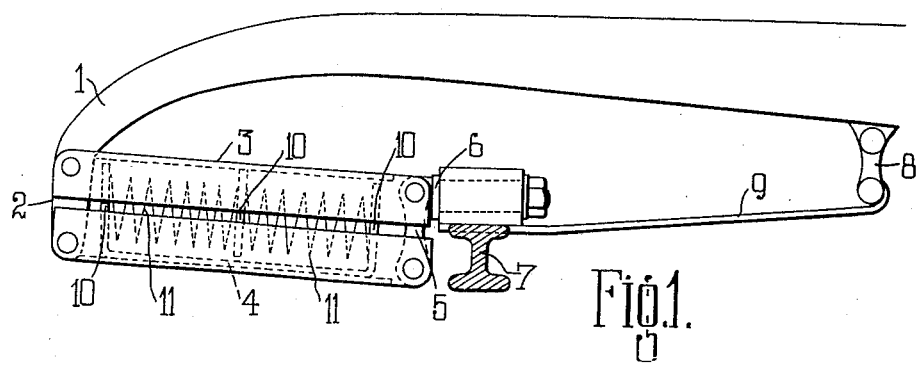
Figure 1 is a diagrammatic side elevation of one form of construction.
Figure 2 is a similar view of a modified form of construction.
Figure 3 is a similar view of a third form of construction.

The frame 1 of a vehicle has at its front end a rigid extension 2 pivotally connected with a pair of intermediate elements 3, 4, which at their other ends are in turn pivotally connected to a link 5.

The intermediate element 3 may be connected to the link 5 by the same pivot as it is connected to an eye-bolt 6 secured to the axle 7 of the vehicle.

In certain cases, it may be desirable to provide a radius rod between the axle 7 and the frame 1 which is connected thereto by a shackle 8, which radius rod may either be a rigid rod or in the form of a leaf spring 9.

The intermediate elements 3, 4, each have upon them one or more projections 10 between which are interposed springs 11, which may act at certain times as compression springs and at certain times as tension springs.

The intermediate elements may be in the form of shrouds partially surrounding the projections as shown in Figure 1.

In the construction illustrated in Figure 2 the intermediate members 15, 16 are provided with extensions 17 alternately arranged in the space between the two links. Rubber blocks 18 are positioned between these extensions 17 whereby a restraining action is exerted upon relative motion of the members 15, 16 resulting from relative movement of the frame 1 and the axle 7.

The intermediate elements 15, 16 are pivoted at one end by pivots 19, 20 to a bolt member 21 secured to the axle 7 and at the other end to the rigid extension 12 by pivots 13 and 14. The intermediate element 15 is, in this case, shown connected by a rigid radius rod 22 to a shackle 23 on the frame 1.

In a further modified form of construction illustrated in Figure 3, the frame 1 has similar pivotal connections to intermediate elements 24, 25, one of these having an upstanding lug 26 threaded round the intermediate member 24, which has a pair of adjustable lugs 27, 28 upon it, helical springs 29, 30 being threaded between the lugs 26 and 27 and 26 and 28 respectively.

The lugs 27 and 28 are threaded internally and may be screwed into any desired position along the link 24 and locked by lock nuts 46 and 47. In this manner the load on the springs may be varied.

In the construction shown in Figure 4 link 31, which is pivotally connected to the frame 1 and the axle 7, is provided with a long projection 32 secured thereto by any suitable means and having an apertured arm 32a which embraces a sleeve 35. The sleeve 35 carries a spring 37 arranged between a projection 38 on the sleeve and the projection 32. The sleeve 35 is slidable on the link 36 which is pivotally connected to the frame 1 and to the axle 7.

The load on the spring 37 can be adjusted by means of an eccentric cam 39 mounted on the link 36 and adapted to be operated from a remote point, such as the driver's seat in a vehicle, by means of a tie member 40 operating on the lever 41 secured to the cam 39. The cam 39 when operated shifts the sleeve 35 along the link 36 and thus alters the load on the spring 37.

Figure 5 shows a system equivalent to that of Figure 4 but in this construction the movement of the sleeve 35 on the link 36 is effected by a pivoted lever 42 operable by a tie member 44 to shift the sleeve 35. One end of the lever 42 bears a projection 45 on the sleeve 35.

Instead of moving a sleeve on the link 36, means may be provided for shifting the projection 32 against the action of the spring 37.

In the construction shown in Figure 6 two springs 47, 48 are arranged one within the other on the lower link 49. The outer spring 48 abuts against a projection 50 on the lower link 49 and a projection 51 on the upper link 52. The projection 51 has an opening 53 therein embracing the link 49 and the inner spring 47. The spring 47 cooperates with the projection 50 and a slidable collar 54 on the link 49, for action as a compression or tension spring. The collar 54 is connected through a lever 55 to the link 52. The lever 55 is pivoted on a bracket 56 on the link 52 and the projection 51.

The load on the spring 47 may be varied from the driver's seat by means of link gear connected to the lever 55.

In the construction shown in Figure 7, springs 58, 59 are arranged on the top and bottom links 60, 61 respectively and bear against the projections 62 and 63 on the links 60 and 61 respectively.

The link 60, only, may be connected to the axle or to the wheel direct.

Rubber bushed bearings 60a may be provided at the pivot points of the links in each of the constructions described, or selected ones of the pivot points may be provided with such rubber bushes.

I declare that what I claim is:—

1. A suspension arrangement for vehicles comprising a frame, a wheel support, a pair of vertically spaced links of fixed lengths, vertically spaced pivot connections between adjacent ends of each of said links and the frame, a pivot connection between the other end of said links and said wheel support whereby the links are caused to swing relative to said frame during relative vertical displacements of the frame and wheel support, means for connecting said links whereby they remain substantially parallel during swinging movement on said frame connections, a projection fixed on each said link, and resilient means located between said projections for opposing said swinging movement of the links.

2. A suspension arrangement for vehicles comprising a frame, a wheel support, a pair of links of fixed length extending longitudinally of the vehicle, vertically spaced pivot connections between each said link and the frame, a pivot connection between one of said link and the wheel support whereby the links are caused to swing relative to said frame during relative vertical displacements of the frame and wheel support, means for maintaining said links in substantial parallelism during swinging movement relative to said frame, and means for opposing swinging movement of said links including projections on said links which relatively approach and recede from one another during swinging movement of the links, and resilient means engaged with said projections for opposing such movement.

3. A suspension arrangement for vehicles comprising a frame, a wheel axle, a substantially vertical extension on said frame rigid therewith, upper and lower links of fixed lengths each pivotally connected at one end to said extension and extending substantially longitudinally of the frame, means for pivotally connecting said links for parallel motion and for pivotally connecting at least one of said links to the axle, a projection secured to the upper link, a projection on said lower link spaced from said first projection, and a resilient element located between said projections whereby it is compressed upon relative upward swinging movement of said links about their connections to said extension.

4. A suspension arrangement for vehicles comprising a frame, a wheel axle, a substantially vertical extension on said frame rigid therewith, upper and lower links of fixed lengths each pivotally connected at one end to said extension and extending substantially longitudinally of the frame, means for pivotally connecting said links for parallel motion and for pivotally connecting at least one of said links to the axle, a projection secured to the upper link at a point adjacent the pivotal connection thereof to said extension, a projection on said lower link spaced from said first projection located adjacent the end of said lower link remote from its pivotal connection to said extension, and a resilient element located between said projections whereby it is compressed upon relative upward swinging movement of said links about their connections to said extension.

5. A suspension arrangement for vehicles comprising a frame having a substantially vertical extension thereon, an axle, a pair of vertically spaced links of fixed length each pivotally connected at one end to said extension and at least one connected at the other end to said axle, a projection on one of said links having an opening therein embracing the other link, at least one projection on the other link, at least one helical spring arranged about said other link and bearing upon said projections and means to shift at least one of said projections to vary the load on said springs.

6. A suspension arrangement for vehicles comprising a frame having a substantially vertical extension thereon, an axle, a pair of vertically spaced links of fixed length each pivotally connected at one end to said extension and at least one connected at the other end to said axle, a projection on one of said links having an opening therein embracing the other link, at least one projection on the other link, at least one helical spring arranged about said other link and bearing upon said projections, threads on said other link, threads on said projection on said other link and means for locking said projections in any desired position on said other link.

7. A suspension arrangement for vehicles comprising a frame having a substantially vertical extension thereon, an axle, a pair of vertically spaced links of fixed length each pivotally connected at one end to said extension and at least one connected at the other end to said axle, a sleeve slidable on one of said links, a projection on the other of said links having an opening therein adapted to embrace said sleeve, projections on said sleeve and a helical spring arranged on said sleeve and arranged between the projections on said sleeve and on said embracing projection.

8. A suspension arrangement for vehicles comprising a frame having a substantially vertical extension thereon, an axle, a pair of vertically spaced links of fixed length each pivotally connected at one end to said extension and at least one connected at the other end to said axle, a sleeve slidable on one of said links, a projection on the other of said links having an opening therein adapted to embrace said sleeve, projections on said sleeve, a helical spring arranged on said sleeve and arranged between the projections on said sleeve and on said embracing projection, and means for adjusting the position of said sleeve on said link.

9. A suspension arrangement for vehicles comprising a frame having a substantially vertical extension thereon, an axle, a pair of vertically spaced links of fixed length each pivotally connected at one end to said extension and at least one connected at the other end to said axle, a sleeve slidable on one of said links, a projection on the other of said links having an opening therein adapted to embrace said sleeve, projections on said sleeve, a helical spring arranged on said sleeve and arranged between the projections on said sleeve and on said embracing projection, an eccentric cam pivoted on said link and means to operate said cam to displace said sleeve on said link.

10. A suspension arrangement for vehicles comprising a frame, a pair of vertically spaced links of fixed length each pivotally connected at one end to said frame, a connection between said links and a wheel of the vehicle, an abutment on one of said links, a projection on the other of said links embracing the first link, a pair of springs arranged one within the other about said first link bearing against said abutment at one end, one of said springs bearing against said projection, a collar slidably mounted on said first link and bearing against the other end of said other spring and a lever pivotally connected to said other link and engaging said collar.

11. A suspension arrangement for vehicles comprising a frame, a wheel supporting member, a substantially vertical extension on said frame rigid therewith, upper and lower links of fixed and substantially equal lengths each pivotally connected at one end to said extension and extending substantially longitudinally of the frame and pivotally connected at the other end to the wheel support whereby the links remain substantially parallel during swinging movement about their connections to said extension, a projection secured to one of said links and extending toward the other link, a projection on said other link, said projections being moved toward and from one another as the links swing about their connections to said extension, and a resilient element located between said projections whereby it is compressed upon relative upward swinging movement of said links about their connections to said extension.

12. A suspension arrangement as in claim 11, in which the projection on one said link is movable along said link, and including means for moving said projection along said link whereby to vary the distance between said projections.

13. A suspension arrangement for vehicles comprising a frame having a substantially vertical extension thereon, a wheel support, a pair of vertically spaced links of fixed and substantially equal length each pivotally connected at one end to said extension, and at the other end to said wheel support, spaced projections on one of said links, a projection on the other said link extending between said spaced projections, and independent resilient energy absorbing means arranged between said latter projection and each of said spaced projections and operating during swinging movement of the links relative to said frame for opposing said movement.

14. A suspension arrangement as in claim 13, including means for adjusting the position of at least one of said spaced projections whereby to vary the load on the corresponding energy absorbing means.

15. A suspension arrangement for vehicles comprising a frame having a substantially vertical extension thereon, an axle, a pair of vertically spaced links of fixed length each pivotally connected to said extension and at least one connected at the other end to said axle, means for maintaining the other link substantially parallel to said first link during swinging movement about the extension connections, a projection on one of said links extending toward the other link, a projection on the other link spaced along the length thereof from said first projection, and resiliently compressible means located between said projections for opposing swinging movement of said links which causes an approximation of said projections.

16. A suspension arrangement for vehicles comprising a frame having a substantially vertical extension thereon, a wheel axle, a pair of vertically spaced links each pivotally connected at one end to said extension and at least one connected at the other end to said axle, a projection on one of said links having an opening therein embracing the other link, at least one projection on the other link spaced along the length thereof from said first projection, and a helical spring arranged about said other link and bearing against said projections for opposing swinging movement of said links relative to said frame.

In witness whereof, I have hereunto signed my name this 4th day of November, 1931.

FULLERTON GEORGE GORDON ARMSTRONG.